United States Patent [19]
Smith

[11] Patent Number: 5,830,987
[45] Date of Patent: Nov. 3, 1998

[54] AMINO-ACRYLATE POLYMERS AND METHOD

[75] Inventor: Stuart B. Smith, Conyers, Ga.

[73] Assignee: Hehr International Inc., Decatur, Ga.

[21] Appl. No.: 815,872

[22] Filed: Mar. 11, 1997

[51] Int. Cl.$^6$ ..................................... C08G 69/26
[52] U.S. Cl. .......................... 528/332; 528/363; 528/392; 521/180; 521/181; 521/183; 521/185; 521/186
[58] Field of Search ..................................... 528/332, 363, 528/392; 521/180, 181, 183, 185, 186

[56] References Cited

U.S. PATENT DOCUMENTS 4,180,632  12/1979  Ilenda ........................................ 521/184

*Primary Examiner*—Duc Truong
*Attorney, Agent, or Firm*—Richard P. Crowley

[57] ABSTRACT

An amino-acrylate polymer is prepared by the reaction of an aliphatic hydroxyl polyacrylate monomer, like pentaerythritol triacrylate, with a polyamine like a hexyldiamine to provide a rigid fast gelling and curing polymer, which polymer may be modified with resin modifiers. The amino-acrylate polymer may be used in the preparation of composite structures with fibers and filler materials.

24 Claims, No Drawings

ND METHOD

BACKGROUND OF THE INVENTION

Acrylate monomers have been widely used with peroxide and radiation curing systems to provide acrylate polymers. In particular, di-functional methyl methacrylate monomers, alone or with mono-functional reactive diluent acrylate monomers, have been used with benzoyl peroxide to provide hard acrylate polymers used for flooring and casting applications. However, typically the curing time is 10 to 30 minutes, depending on the polymer thickness, and often such polymers are brittle and are associate with a residual odor.

Acrylate monomers and acrylate oligomers, such as epoxy, urethane and elastomeric acrylate oligomers, when used with photo initiators, will cure rapidly in the presence of ultra violet (UV) light. However, while curing times are often quite fast, high-intensity UV light is required, and the thickness of the films produced and the colors of the resulting cured polymers often cause acceptance problems.

It is desirable to provide hard, transparent, high-impact acrylate polymers with fast gel and cure times and which are easily prepared and particularly useful in composite structures.

SUMMARY OF THE INVENTION

The invention relates to a method of preparing acrylate polymers with fast gel and curing times, and which acrylate polymers may be prepared as transparent, hard, high-impact or modified acrylate polymers. In particular, the acrylate polymers of the invention are prepared from high functional acrylate monomers and polyamines in a rapid, simple, fast, non-catalyzed reaction method.

The invention comprises a method of producing acrylate polymers by reacting, in a liquid reaction mixture, an aliphatic acrylate monomer having three or more, such as four or five, acrylate ester groups, and which acrylate monomer has at least one reactive hydroxyl group with an alkyl-substituted aliphatic polyamine.

Typically, the high functionality-OH acrylate monomer comprises a liquid which is reacted at room temperature, 15°–25° C., in approximate stoichiometric amounts, with a liquid polyamine, without the need for catalyst or curing agents or systems. The components of the reaction mixture may be modified by varying the polyamine quantities and compounds to control the resulting gel and cure times and to provide acrylate polymers of selected and controlled hardness; for example, but not to be limited to, Shore D hardness of about 70 to 90 in 1 to 3 minutes.

The method of preparation merely requires the admixture of the acrylate monomer and the polyamine, alone or in the presence of a liquid, reactive or nonreactive diluent. The method provides for gel and cure times of less than about 5 minutes, and more typically, less than about 1 or 2 minutes, to a gel condition or a tack-free surface condition.

The reaction mixture may be used to produce a non-brittle, clear-transparent acrylate polymer or used with varying amounts of filler materials; e.g. up to 50 percent by weight of the composition, such as 0 to 35 percent by weight, as desired. The filler materials may include particulate materials, alone or in combination, such as: fiber, like chopped glass fibers, in a spray operation, or other reinforcing fibers; or with inert fillers, like calcium carbonate; metal oxides, like titanium dioxide; pigments; coloring agents; mica; as well as granite, marble or stone chips or dust, for example, to produce sinks and counter tops with higher gloss, toughness, chemical resistance and UV stability than comparable polyester resin sinks and counter tops. The acrylate polymers may be used alone or with the employment of various unsaturated polyester resins. Other fillers include, but are not limited to: flame and scratch retardants, like aluminum trihydrate and halogenated compounds; plasticizers; resins; waxes; and other polymers and resins.

The reaction mixture may be used as a gel coat in composite structures, and applied in a film, spray, cast, coated or molded application, e.g. RIM application. It has been found that the high-functional amino-acrylate polymer produced is not brittle, is UV stable and suitable for outdoor application, and has good wet out characteristics when combined with glass fibers, such as sprayed in a two-component machine which includes a fiberglass chopper. Further, unlike methyl methacrylate polymers, the acrylate polymers are not inherently brittle and have a high-impact strength similar to polyurethanes or polycarbonates.

The hydroxyl high functional polyacrylate-hydroxy monomer may comprise pentaerythritol triacrylate as one preferred compound; however, pentaerythritol tetracrylate and dipentaerythritol pentacrylate may also be used with fast reaction times. Other polyacrylate polyhydroxy monomers include alkoxylated tri-, treta- and pentamonomers, like ethoxylated pentaerythritol tetracrylate. The method requires that the acrylate monomer be a tri- or higher-functional acrylate with at least one reactive hydroxy group, since related compounds, such as trimethyl propyl triacrylate provides no reaction with the polyamine. When hydroxyl-containing lower functional acrylates were used in the reaction, such as hydroxyethyl diacrylate and hydroxypropyl diacrylate, they were not found suitable. These diacrylate monomers provided an exothermic reaction, but the resulting polymers did not cure in 24 hours, which indicates the hydroxyl groups are reacting but much higher functionality is required.

It has been found that the acrylate polymer may be modified by the use of additional hydroxyl-containing compounds to control gel and cure times and particular polymer hardness, such as the use of diol and triol caprolactones to provide a faster reaction time.

The alkyl-substituted aliphatic polyamine used in the method comprises a methyl-substituted aliphatic (e.g., hexyl) polyamine, like a diamine, and more particularly and preferred, a methylcyclohexyl diamine, such as 3-aminomethyl- 3,5,5-trimethylcyclohexylamine (known as VESTAMIN® IPD isophorone diamine, a trademark of H üls AG). The IPD provides for a hard, clear acrylate polymer with the pentaerythritol triacrylate (PETA). Trimethyl hexamethylene diamine (known as VESTAMIN® TMD, a branched aliphatic diamine, a trademark of Hüls AG) may also be used as the aliphatic (hexyl) polyamine, alone or in combination with the IPD. The TMD acrylate polymer has less hardness than the IPD polymer and thus may be combined with the IPD as a hardener monomer modifier.

Other suitable polyamines for use in the reaction mixture include an alkyl-substituted benzyl diamine, like meta-xylylenediamine. The reactive polyamines reacted with the high functionality polyacrylate-hydroxyl monomers may be used alone or in combination to provide a polymer of selected gel and cure times, hardness and other properties. Other aliphatic diamines and triamines, like the Jeffamines, were tried; however, the reaction times were too long.

Further, it has been found that the use of water in the reaction mixture results in accelerated gel and cure times of typically to less than 1 minute; e.g., less than 10 to 15 seconds, by, for example, the use of about 0.5 to about 5.0 percent of water with the PETA and IPD reaction mixture.

Also, it has been discovered that the employment of modifying resins in the reaction mixture provides modified resin-acrylate polymers of desireable properties. In particular, modifying amounts, for example 0 to 50 percent by weight, such as 5 to 25 percent by weight, may be incorporated in the reaction mixture. Suitable thermosetting resins include, but are not limited to: melamine-formaldehyde; urea-formaldehyde; phenol-formaldehyde; phenol-furfural; as well as various epoxy resins, alone or in selected combinations. For example, 5 to 15 percent of melamine-formaldehyde resin in a PETRA-IPD or TMD mixture results in a flexible polymer, while the addition of epoxy resins provides excellent resin-acrylate polymeric films and often accelerates cure times of the reaction mixture.

Thus, the method in one preferred embodiment is the reaction of PETA with IPD, and optionally, as required, with modifying amounts for 0 to 50 present by weight, e.g. 5 to 25 percent, of caprolactones or hexyl polyamines to provide softer acrylate polymers.

The invention will be described for the purposes of illustration only in connection with the embodiments. However, a person skilled in the art may make various modifications, changes, improvements and additions to the embodiments or illustrated embodiments, all without departing from the spirit and scope of the invention,

EXAMPLES

Example 1

40 PBW of Peta-K (Pentaerythritol triacrylate)
30 PBW of IPD (isophorone diamine)
The two materials were mixed and poured into a plate mold 6"×8"×¼" in size.
Gel time=55 sec (100 gram mass)
Tack free=60 sec
Shore D hardness in 3 minutes=85D

Example 2

40 PBW Peta-K
30 PBW TMD
Gel time=30 sec
Tack free=45 sec
Hardness 1.5 min=70D

Example 3

40 PBW Peta-k
15 PBW IPD
15 PBW TMD
Gel time=45 sec
Tack free=50 sec
Shore D=77D

Example 4

40 PBW Peta-K
30 PBW D-230 (Jeffamine) diamine–molecular wt.=230
Gel time=3 min
Tack free=3.5 min
Hardness=85 Shore A

Example 5

40 PBW Peta-K
40 PBW T-403 (Jeffamine triamine) molecular wt.=403
Gel time=5 min
Tack free=15 min
Hardness=85A

Example 6

40 PBW TMPTA (trimethyl propyl triacrylate)
30 PBW IPD
Gel time=none

Example 7

40 PBW Hydroxyethyl diacrylate
20 PBW IPD
Gel time=none
However, after 2 minutes exotherms of 180° F. were obtained

Example 8

40 PBW Hydroxypropyl diacrylate
20 PBW IPD
Gel time=none
However, after 2 minutes 180° F. exotherm reaction

Example 9

40 PBW (¼ Butane diol) diacrylate
20 PBW IPD
No reactions, no exotherms

Example 10

40 PBW Ethoxylated epoxy diacrylate
20 PBW IPD
No reactions, no exotherms

Example 11

40 PBW Polyethylene diacrylate
20 PBW IPD
No reactions, no exotherms

Example 12

40 PBW Pentaerythritol tetracrylate
40 PBW IPD
Gel time=40 sec
Tack free=45 sec
Hardness=88D

Example 13

40 PBW Dipentaerythritol pentacrylate
50 PBW IPD
Gel time=40 sec
Tack free=45 sec
Hardness=88D

Example 14

40 PBW Peta-K
30 PBW Ethacure 100 (Primary aromatic diamine)
No reaction

Example 15

40 PBW Peta-K
30 PBW Unilink 4200 (Secondary aromatic diamine)
No reaction

Example 16

30 PBW Peta-K
10 PBW Tone 301 (caprolactone triol GA=520)
22 PBW IPD
Gel time=40 sec
Tack free=45 sec
Hardness=80D

Example 17

30 PBW Peta-K
10 PBW Tone 201 (caprolactone diol)
22.5 PBW IPD
Gel time=42 sec
Tack free=46 sec
Hardness=75D

Example 18

40 PBW Peta-K
20 PBW 1,6 Hexane diacrylate
No reaction

Example 19

30 PBW Peta-K
10 PBW M-100 (Tone with free radicals)
26 PBW IPD
Gel time=45 sec
Tack free=50 sec
Hardness=82D

Example 20

40 PBW Peta
1 PBW $H_2O$
30 PBW IPD
Gel time=from 55 seconds to 10 seconds
A rigid polymer results

Example 21

40 PBW Peta
10 PBW Cymel 303F (melamine-formaldehyde resin)
30 PBW IPD
Gel time=90 seconds
A flexible part results

Example 22

25 PBW Peta
25 PBW 828 (Epoxy Bisphenol A resin)
14 PBW IPD
14 PBW TMD
Gel time=3 min
Very rigid
(828 and IPD and TMD cure 2 hrs without Peta)

Example 23

25 PBW Peta
25 PBW Epoxy Bisphenol F Dow 354
14 PBW IPD
14 PBW TMD
Gel time=3 min
very rigid
(dow 354 and IPD and TMD 2 hrs gel)

What is claimed is:

1. A method of producing a resin-modified acrylate polymer, which method comprises:
   reacting in a liquid reaction mixture an aliphatic acrylate monomer having three or more ester acrylate groups and at least one reactive hydroxyl group, an alkyl-substituted aliphatic polyamine and up to 50 percent by weight of a thermosetting, modifying resin.

2. The method of claim 1 wherein the acrylate monomer comprises a pentaerythritol polyacrylate.

3. The method of claim 2 wherein the acrylate monomer comprises a $C_2$–$C_3$ alkoxylated pentaerythritol.

4. The method of claim 1 wherein the aliphatic polyamine comprises an alkyl-substituted cyclohexyl diamine.

5. The method of claim 4 wherein the aliphatic diamine comprises an aminomethyl, trimethyl cyclohexylamine.

6. The method of claim 5 which includes reacting approximate stoichiometric amounts of the acrylate monomer and polyamine.

7. The method of claim 6 wherein the acrylate monomer comprises pentaerythritol triacrylate.

8. The method of claim 1 wherein the polyamine comprises an alkyl hexamethylene polyamine.

9. The method of claim 8 wherein the hexamethylene polyamine comprises a methyl hexamethylene diamine.

10. The method of claim 1 which includes introducing and reacting in the reaction mixture a polyol caprolactone to increase the reaction cure time and provide an acrylate polymer of reduced hardness.

11. The method of claim 1 wherein the polyamine comprises a mixture of an aminomethyl-trimethylcyclohexylamine and a trimethyl hexamethylene diamine.

12. The method of claim 1 wherein the thermosetting, modifying resin is selected from the group consisting of: melamine-formaldehyde; phenol-formaldehyde; urea-formaldehyde; phenol-furfural; and epoxy resins; and combinations thereof.

13. The method of claim 1 wherein the polyamine comprises a meta-xylylenediamine.

14. The method of claim 1 which incorporates in the reaction mixture from about 0.5 to 5.0 percent by weight of water.

15. The method of claim 1 which includes applying the acrylic monomer and polyamine in the presence of fibrous material onto a surface to produce a composite material.

16. The method of claim 1 which includes carrying out the reaction in a curing time of less than about 2 minutes.

17. The method of claim 1 which includes introducing particulate filler material in the reaction mixture in an amount up to about 50 percent by weight of the total composition.

18. The method of claim 17 which includes introducing and reacting in the reaction mixture an unsaturated polyester resin.

19. The method of claim 1 which includes applying the reaction mixture as a gel coat onto a fiber-resin surface to provide a composite material.

20. The method of claim 15 which includes spraying the reaction mixture in the presence of and with chopped glass fibers onto a surface to provide a glass fiber reinforced composite material.

21. The acrylate polymer produced by the method of claim 1.

22. The acrylate polymer produced by the method of claim 7, which acrylate polymer is a high-impact, hard, transparent polymer.

23. The composite material produced by the method of claim 15.

24. A method of producing a modified amino-acrylate polymer which comprises: reacting in a liquid reaction mixture a polyacrylate-hydroxy monomer selected from the group consisting of: pentaerythritol triacrylate; pentaerythritol tetracrylate; dipentaerythritol pentacrylate; and combinations thereof; a polyamine selected from the group consisting of: meta-xylylenediamine; trimethyl hexamethylene diamine; aminomethyl-trimethyl cyclohexylamine; and combinations thereof, and the reaction carried out in the presence of a modifying, thermosetting resin, the modifying resin selected from the resin group of melamine-formaldehyde, urea-formaldehyde, phenol-formaldehyde, phenol-furfural, epoxy resins and combinations thereof.

* * * * *